US005896893A

United States Patent [19]

Toshima et al.

[11] Patent Number: 5,896,893
[45] Date of Patent: Apr. 27, 1999

[54] PIPE HAVING RIDGE ON SPIGOT AND METHOD OF FORMING THE RIDGE

[75] Inventors: Toshio Toshima; Takahiro Ishihara; Atsuichi Namariyama, all of Amagasaki, Japan

[73] Assignee: Kubota Corporation, Osaka, Japan

[21] Appl. No.: 08/607,678

[22] Filed: Feb. 27, 1996

[30] Foreign Application Priority Data

Dec. 28, 1995 [JP] Japan ................................. 7-342048
Jan. 17, 1996 [JP] Japan ................................. 8-005298

[51] Int. Cl.⁶ .................................................. F16L 21/08
[52] U.S. Cl. ............................ 138/109; 285/374; 285/415
[58] Field of Search ............................ 138/109; 285/337, 285/374, 415, 414, 405

[56] References Cited

U.S. PATENT DOCUMENTS 3,861,722  1/1975  Kenyon ................................ 285/337
3,861,724  1/1975  Spinner ................................ 285/415

FOREIGN PATENT DOCUMENTS 52-29624   3/1977   Japan .............................. 285/374
54-34124   3/1979   Japan .............................. 285/374
1319595    6/1973   United Kingdom ............. 285/374
2156467    10/1985  United Kingdom ............. 285/374

Primary Examiner—Anthony Knight
Assistant Examiner—Gary Grafel
Attorney, Agent, or Firm—Fildes & Outland, P.C.

[57] ABSTRACT

A pipe having a ridge on the spigot and a method of producing such ridge. A ring having a circumferentially disposed split or splits is fitted in an annular groove formed in the outer periphery of the spigot, with the diameter of said ring being adjusted according to the tolerance of the outer diameter of the pipe. A pair of thin-walled portions formed on the circumferentially opposite ends of the ring defining the split are connected together by a connector or connectors operated from the outer peripheral side of the ring.

15 Claims, 19 Drawing Sheets 5,896,893

PIPE HAVING RIDGE ON SPIGOT AND METHOD OF FORMING THE RIDGE

FIELD OF THE INVENTION

The present invention relates to a pipe having a ridge on the spigot and a method of forming the ridge.

BACKGROUND OF THE INVENTION

As a kind of pipe joint, there is known a separation preventing pipe joint, wherein a socket formed on an end of one of the pipes to be joined together receives a spigot formed on an end of the other pipe and a separation preventing function is applied between the socket and spigot. In this pipe joint having such separation preventing function, the intended separation preventing function is exerted in that the ridge formed on the outer periphery of the front end of the spigot engages a lock ring received in the inner periphery of the socket. The ridge on the front end of the spigot is formed by forming an annular groove in the outer periphery of the front end of the spigot and fitting a separation preventing ring in this annular groove. In the case where such ridges are formed in a pipe manufacturing plant, the formation of the ridge on a pipe is attained by forming the outer periphery of the front end of the spigot with an annular groove, fitting a separation preventing ring in said annular groove, welding the ring fitted in the annular groove to the pipe, and applying a tapering process to the front end of the spigot including the front end of said ring.

However, such operation of welding the ring to the spigot presents a problem that it requires much time and labor even when the operation is performed in the manufacturing plant as described above. Further, in the case where pipe cutting operation is to be effected in order to reduce the length of pipes. e.g., in a pipe laying site, welding operation is required in such laying site; thus, there is a problem that the operating efficiency is very low.

SUMMARY OF THE INVENTION

Accordingly, an object of the invention is to simplify the operation of forming a ridge on the outer periphery of a spigot.

To achieve this object, a pipe having a ridge on the spigot according to the present invention comprises;

an annular groove formed in the outer periphery of said spigot, a ring fitted in said annular groove and having one or more circumferentially disposed splits, a pair of thin-walled portions formed at circumferentially opposite ends of the ring defining said split, and means for connecting said thin-walled portions together by operation performed from the outer peripheral side of the ring, said connecting means connecting said thin-walled portions together, with the ring diameter being adjusted according to the tolerance of the outer diameter of the pipe.

A method of forming a ridge on the spigot of a pipe according to the present invention comprises the steps of;

fitting a ring having one or more circumferentially disposed splits in an annular groove formed in the outer periphery of said spigot, said ring diameter being adjusted according to the tolerance of the outer diameter of the pipe, and connecting together a pair of thin-walled portions formed in circumferentially opposite ends of the ring defining said split by connecting means operated from the outer peripheral side of the ring.

Therefore, according to the invention, a ridge can be simply formed on the outer periphery of a spigot without involving welding or the like.

DESCRIPTION OF THE PREFERRED EMBODIMENTS

A first embodiment of the present invention will now be described with reference to FIGS. 1 through 10.

Figure 10:
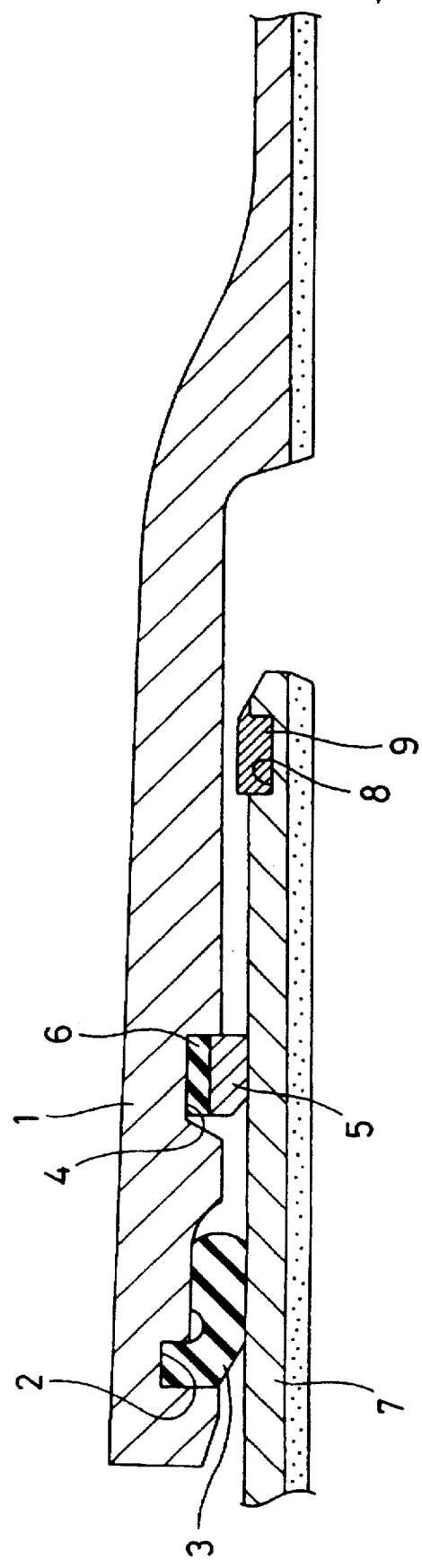
FIG. 10 is a sectional view of a separation preventing pipe joint using a spigot having a ring attached thereto according to the invention.

FIG. 10 shows an example of a separation preventing pipe joint of the slip-on type using a pipe having a ridge on the spigot. In FIG. 10, the numeral 1 denotes a socket formed in an end of one of the cast iron pipes to be joined together, with a seal packing 3 of rubber fitted in a seal packing receiving groove 2 formed in the inner peripheral surface of the front end of the pipe. Further, formed in a farther inner area of the inner peripheral surface of the socket 1 than the seal packing receiving groove 2 is a lock ring receiving groove 4, in which a rock ring 5 of metal is fitted. A centering ring 6 of rubber is interposed between the outer peripheral surface of the lock ring 5 and the inner peripheral surface of the lock ring receiving groove 4 for aligning the axis of the lock ring 5 with the axis of the socket 1.

The numeral 7 denotes a spigot formed on an end of the other cast iron pipe, inserted in the socket 1. An annular groove 8 is formed in the outer periphery of the front end of the spigot 7, with a ring 9 of metal fitted in said annular groove 8 for forming a spigot ridge.

Figure 1:
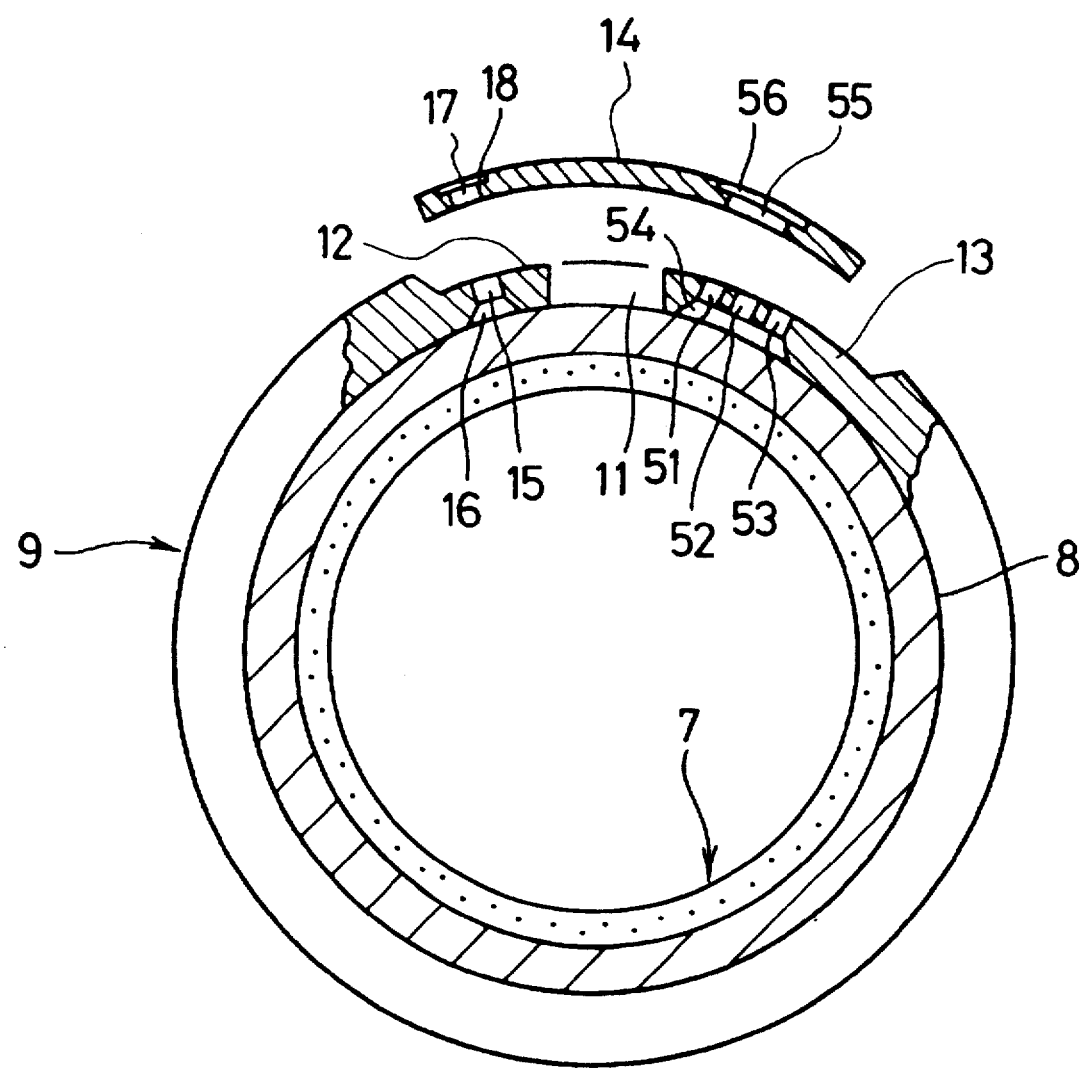
FIG. 1 is a view showing how a ring and a coupling piece are mounted in an annular groove formed in the outer periphery of a spigot according to a first embodiment of the invention.
Figure 2:
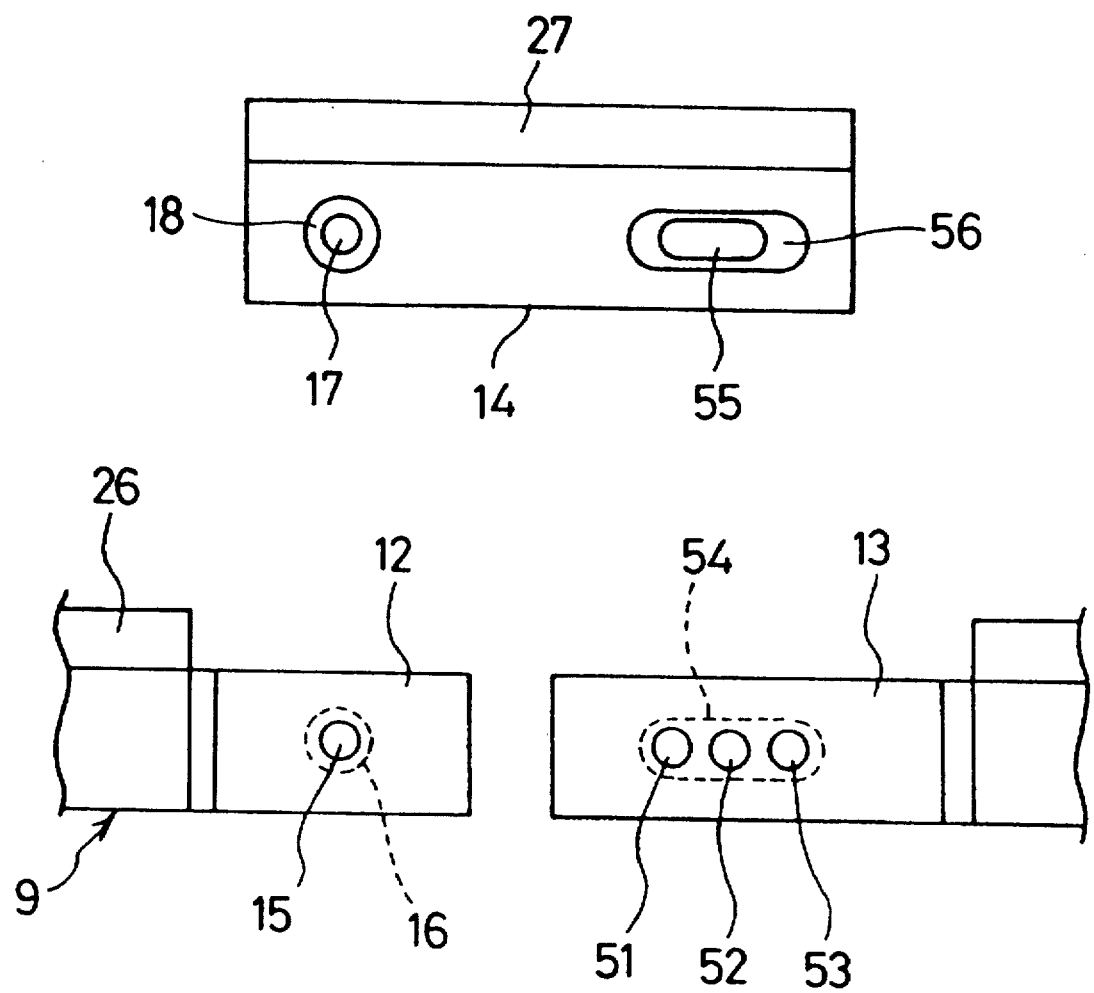
FIG. 2 is a plan view of the principal region of the portion shown in FIG. 1.

As shown in FIGS. 1 and 2, the ring 9 is split at a single circumferential place, such split 11 having a given circumferential length. The circumferentially opposite ends which define the split 11 in the ring 9 are formed with thin-walled portions 12 and 13 by scraping the outer sides.

A coupling piece 14 of metal is installed between the thin-walled portions 12 and 13 to overlie the thin-walled portions 12 and 13 from the outer peripheral side to circumferentially couple the thin-walled portions 12 and 13. The coupling piece 14 is made of arcuate plate material.

At a place on one thin-walled portion 12, there is formed a first connecting hole 15 radially extending therethrough, said first connecting hole 15 being formed with a tapered diameter-increased portion 16 in the inner peripheral side of the ring 9. At one place on one end of the coupling piece 14, there is formed a coupling hole 17 radially extending therethrough and coaxial with said first connecting hole 15. This coupling hole 17 is formed with a large diameter portion 18 in the outer peripheral side of the coupling piece 14.

The other thin-walled portion 13 is formed with circumferentially disposed, second, third and fourth coupling holes 51, 52 and 53 radially extending therethrough. The inner peripheral surface of the thin-walled portion 13 is formed with a recess 54 having a circumferential length corresponding to all of the second through fourth coupling holes 51, 52 and 53. As shown in FIG. 2, the width of the recess 54 is greater than the inner diameters of the second through fourth coupling holes 51, 52 and 53.

At one place on the other end of the coupling piece 14, there is formed a circumferentially elongated hole 55 radially extending therethrough. The elongated hole 55 is capable of overlapping at least one of the second through fourth coupling holes 51, 52 and 53. The elongated hole 55 is formed with a widened portion 56 in the outer peripheral surface of the coupling piece 14.

Figure 3:
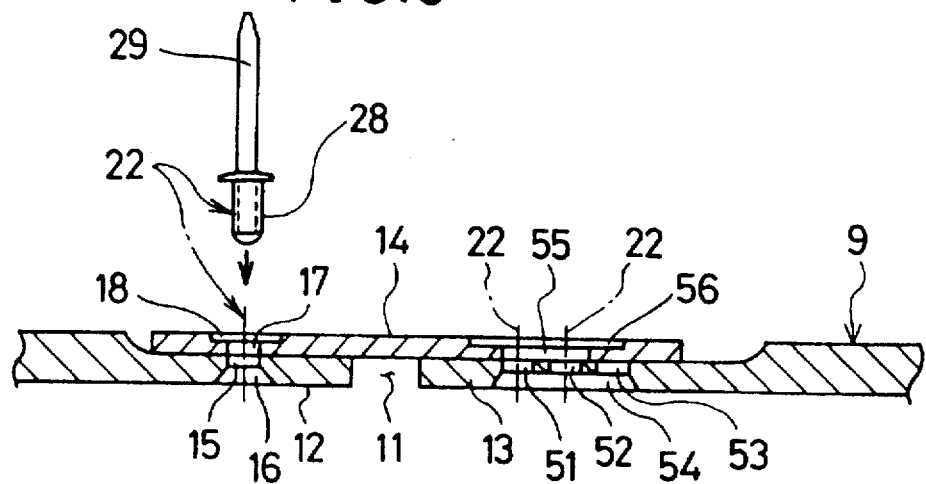
FIG. 3 is sectional view, partly in development, showing an example of the fastening completion state of the portion shown in FIG. 1.
Figure 4:
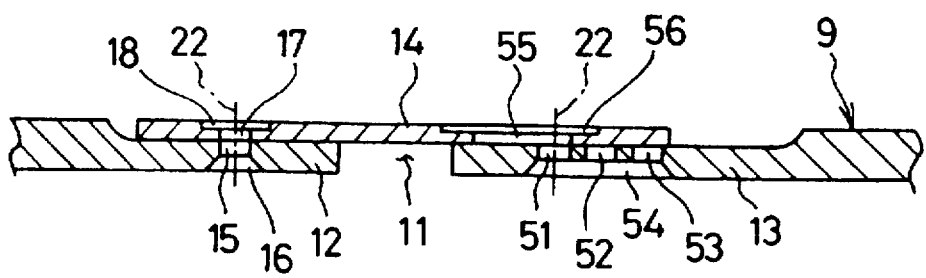
FIG. 4 is a sectional view showing, in development, another example of the fastening completion state of the portion shown in FIG. 1.
Figure 5:
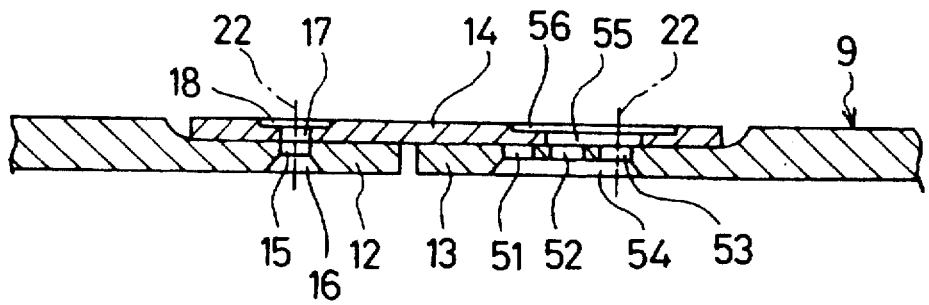
FIG. 5 is a sectional view showing, in development, still another example of the fastening completion state of the portion shown in FIG. 1.

As shown in FIGS. 3 through 5 and 7, the thin-walled portion 12 and the coupling piece 14 are fastened together by a blind rivet 22 inserted in the coupling hole 17 and the first connecting hole 15. As shown in FIGS. 3 through 5, the thin-walled portion 13 and the coupling piece 14 are fastened together by a similar blind rivet 22 inserted in at least one of the second through fourth coupling holes 51, 52 and 53 and the elongated hole 55.

Figure 6:
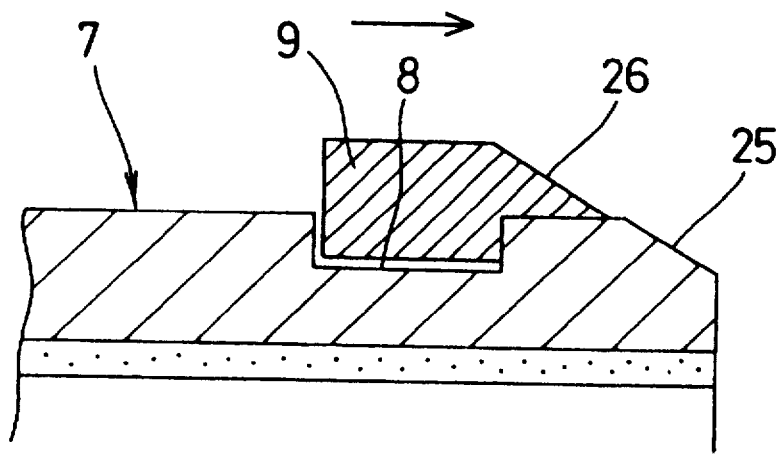
FIG. 6 is a view showing a ring mounted in the portion shown in FIG. 1.
Figure 7:
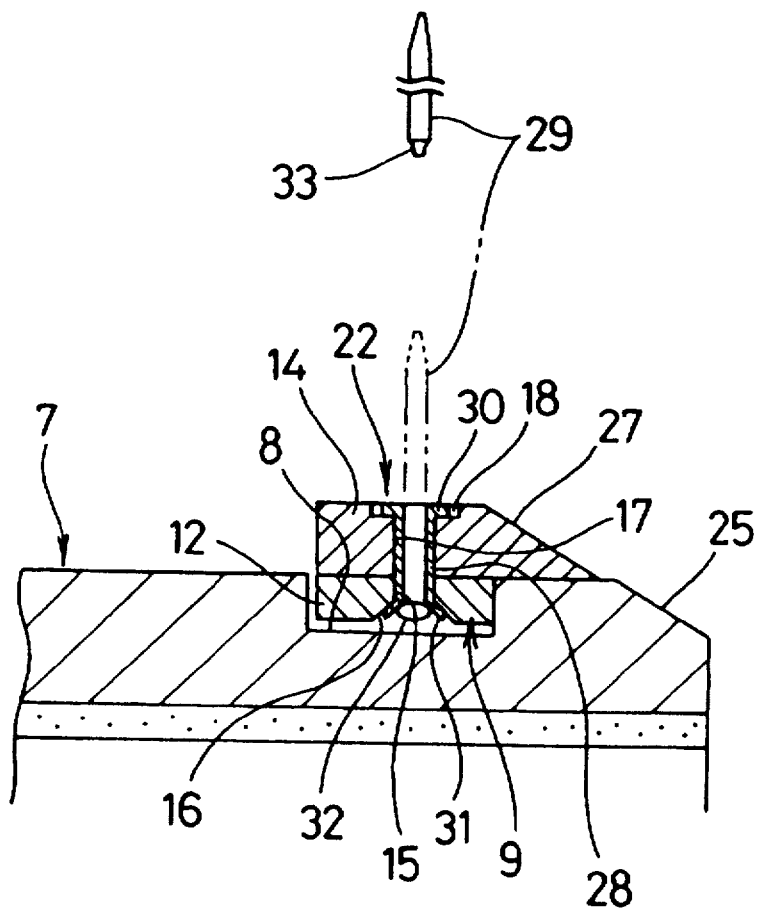
FIG. 7 is a view showing the mounted state of of thin-walled portion, a coupling piece and a blind rivet in the portion shown in FIG. 1.

As shown in FIG. 6, the outer periphery of the ring 9 is formed with an inclined surface 26 continuous with a tapered surface 25 formed in the front end of the spigot 7. Further, as shown in FIG. 7, the coupling piece 14 is also formed with a similar inclined surface 27.

Figure 8:
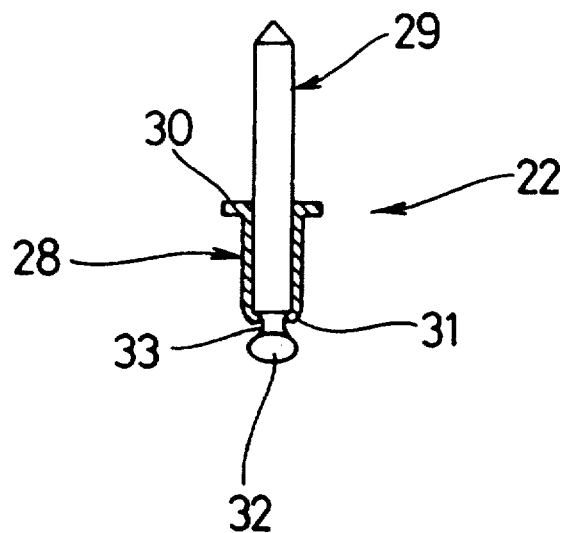
FIG. 8 is a view showing the sectional construction of the blind rivet.

The blind rivet 22, as shown in FIG. 8, comprises a cylindrical rivet body 28 and an extractive rod 29 inserted in the rivet body 28, with a flange 30 formed on one end of the rivet body 28. The front end of the extractive rod 29 is formed with a bead 32 for engagement with the other end 31 of the rivet body, and it is also formed with a notch 33 adjacent the bead 32.

Therefore, as shown in 3 and 7, for example, if the first connecting hole 15 of the ring 9 is aligned with the coupling hole 17 of the coupling piece 14 and the blind rivet 22 is inserted from the outer peripheral side into these holes 17 and 15, the flange 30 fits in the large diameter portion 18 of the coupling hole 17, while the other end 31 and the bead 32 fit in the diameter-increased portion 16 of the first connecting hole 15. Thus, the extractive rod 29 is radially outwardly pulled with the flange 30 of the rivet body 28 held down from the outer peripheral side, whereupon the bead 32 engages the other end 31 of the rivet body to plastically deform the other end 31 in the diameter increasing direction, whereby the bead 32 and the other end 31, which has been increased in diameter, are caulked against the diameter-increased portion 16. And the extractive rod 29 is further pulled until it breaks at the notch 33, as shown in FIG. 7 and is extracted, leaving the caulked bead 32. As a result, the coupling piece 14 and the thin-walled portion 12 of the ring 9 are fastened together without any projection being left on the outer surface of the coupling piece 14.

Figure 9:
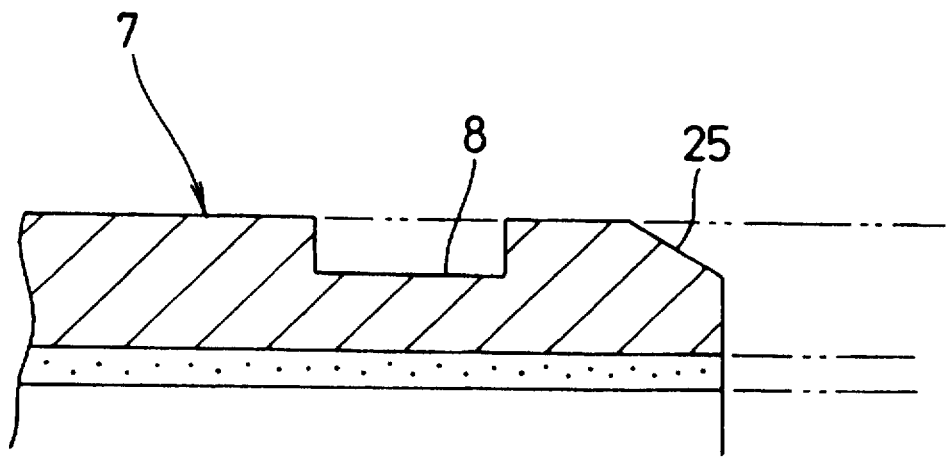
FIG. 9 is a view for explaining the cutting of a pipe for a spigot.

The method of forming a spigot ridge, i.e., the method for mounting the ring 9 in the annular groove 8 in the spigot 7 in the stage prior to inserting the spigot in the socket, will now be described. Generally, the annular groove 8 in the spigot 7 is formed by machining in a pipe manufacturing plant. In a special case, as when pipes are cut in a pipe laying site, as shown in FIG. 9, the annular groove 8 and the tapered surface 25 are formed by machining in this site.

First, while the ring 9 is being increased in diameter along the taper surface 25, the ring 9 is slid onto the spigot 7 until it fits in the annular groove 8, as shown in FIG. 6. At this time, the ring 9 is disposed in the annular groove 8 to be closer to the front end of the spigot, as shown, and is fixed on the spigot as by a clamping device. Thereafter, the coupling piece 14, as shown in FIG. 1, is laid from the outer peripheral side between the thin-walled portions 12 an 13 of the ring 9, with the coupling hole 17 of the coupling piece 14 aligned with the first connecting hole 15 of one thin-walled portion 12. And, as shown in FIG. 3, the blind rivet 22 is inserted in the coupling hole 17 and first connecting hole 15, and the extractive rod 29 is extracted, as described above, so that as shown in FIG. 7, the coupling piece 14 and the thin-walled portion 12 are fastened together. For this fastening operation, it is convenient to use a hand-held riveter which is capable of performing two operations simultaneously, i.e., holding down the flange 30 of the rivet body 28 and extracting the extractive rod 29.

Next, as shown in FIGS. 3 through 5, at least one of the connecting holes 51, 52 and 53 in the other thin-walled portion 13 which can be aligned with the elongated hole 55 of the coupling piece 14 is selected, and the blind rivet or rivets 22 are inserted in the selected connecting hole or holes, 51, 52 and/or 53, and the elongated hole 27; thus, the coupling piece 14 and the thin-walled portion 13 are likewise fastened together. At this time, the flange 30 of the rivet body 28 fits in the widened portion 56, and the other end 31 of the rivet body 28 and the bead 32 are caulked against the recess 54.

Since the coupling piece 14 has the elongated opening 55 and the thin-walled portion 13 has the plurality of circumferentially disposed connecting holes 51, 52 and 53, the coupling piece 14 and the thin-walled portion 13 can be fastened together even if the outer diameter of the spigot 7 varies within the tolerance. Stated in more detail, in the case where the outer diameter of the spigot 7 has been finished to a standard size, as shown in FIG. 3, the elongated hole 55 of the coupling piece 14 overlaps the second and third connecting holes 51 and 52 of the thin-walled portion 13, and two blind rivets 22 are inserted in the elongated hole 55 and the second connecting hole 51, and the elongated hole 55 and the third connecting hole 52, thereby fastening the coupling piece 14 and thin-walled portion 13 at two places.

In the case where the outer diameter of the spigot 7 has been finished to the upper limit of the tolerance, as shown in FIG. 4, the elongated hole 55 of the coupling piece 14 overlaps at least the second connecting hole 51 located on the foremost side of the thin-walled portion 14. In this case, one blind rivet 22 is inserted in the elongated hole 55 and the second connecting hole 51, thereby fastening the coupling piece 14 and the thin-walled portion 13 at one place.

In the case where the outer diameter of the spigot 7 has been finished to the lower limit of the tolerance, as shown in FIG. 5, the elongated hole 55 of the coupling piece 14 overlaps at least the fourth connecting hole 53 located on the innermost side of the thin-walled piece 13, and one blind rivet 22 is inserted in the elongated hole 55 and the fourth connecting hole 53, thereby fastening the coupling piece 14 and the thin-walled portion 13 at one place.

Thus, even if the outer diameter of the spigot 7 varies within the tolerance, the inner diameter of the ring 9 is adjusted according to this tolerance and the ring 9 is reliably attached to the spigot 7.

In the above, as shown in FIGS. 1 through 5, an example has been described in which three connecting holes 51, 52 and 53 are formed in the thin-walled portion 13. However, the number of these connecting holes is not limited to three; it may be two or four or more. The number of connecting holes 15 and coupling holes 17 may be two or more, respectively. Further, in the above example, the ring 9 has been shown split at one circumferential place; however, it may be split at two or more places according to the diameter of the pipe. Further, in the above, a blind rivet 22 has been shown as a fastener; however, instead of providing such blind rivet, the connecting holes 15, 51, 52 and 53 may be internally threaded to receive bolts or screws for fastening the coupling piece 14.

Further, in the above example, the thin-walled portions 12 and 13 have been shown disposed on the inner peripheral side, with the coupling piece 14 shown disposed on the outer peripheral side; however, thin-walled portions may be formed by scraping the inner peripheral portions of the opposite ends of the ring 9 defining the split 11, with these thin-walled portions overlapping the coupling piece so that the latter is disposed on the inner peripheral sides of these thin-walled portions.

Further, in the above example, a pipe having a ridge on the spigot according to the invention has been shown applied to a separation preventing pipe joint of the slip-on type; however, the invention is not limited thereto. For example, it may be applied to a pipe joint, such as a mechanical joint or earthquake-proof joint, in which a seal packing is compressed by a thrust ring fastened to a spigot.

Figure 11:
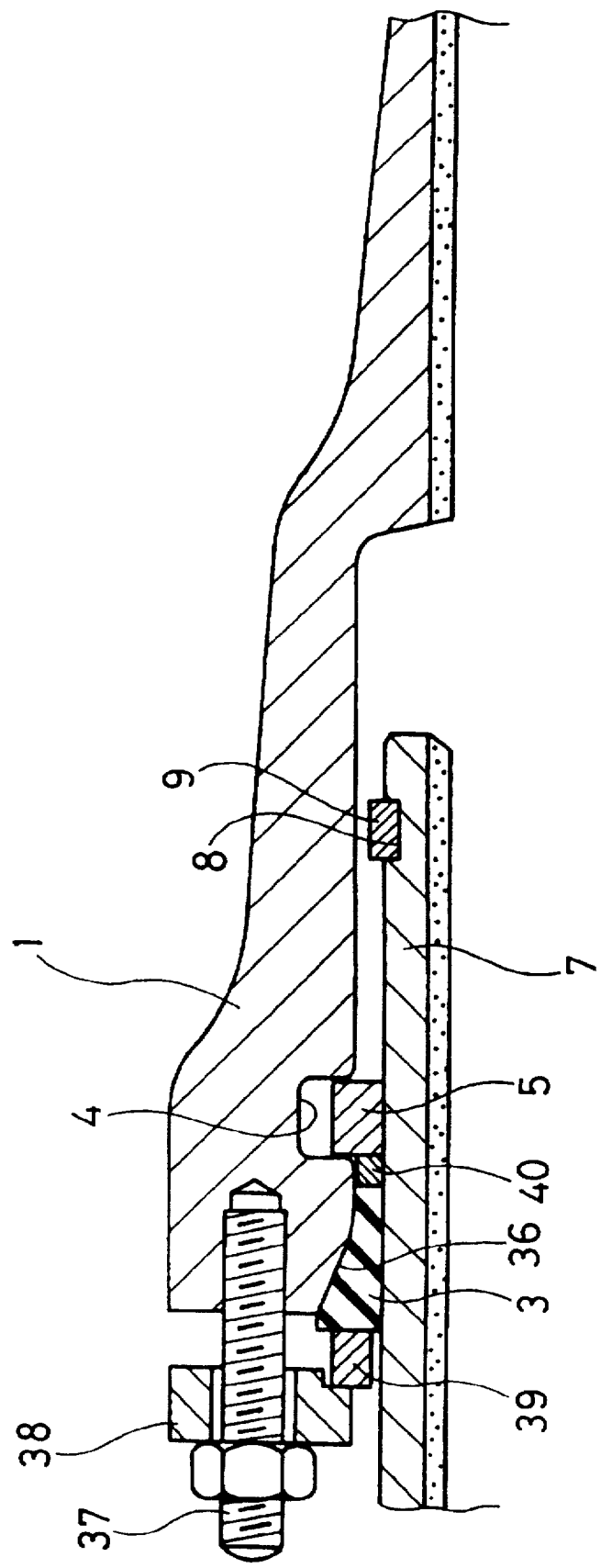
FIG. 11 is a sectional view of another example of a separation preventing pipe joint using a spigot having a ring attached thereto according to the invention.

FIG. 11 shows by way of example a pipe having a ridge on the spigot according to the invention applied to an earthquake-proof joint. In this earthquake-proof joint, a seal packing 3 is disposed between a tapered surface 36 formed on the open end of the socket 1 and the outer peripheral surface of the spigot 7, said seal packing 3 being compressed by a thrust ring 38 and a split ring 39 which are tightened by a bolt and nut assembly 37 projecting from the end surface of the socket 1. A backup ring 40 is disposed between the seal packing 3 and a lock ring 5 disposed in a farther inner region of the socket than the seal packing 3.

FIGS. 12 through 18 show a second embodiment of the invention.

Figure 13:
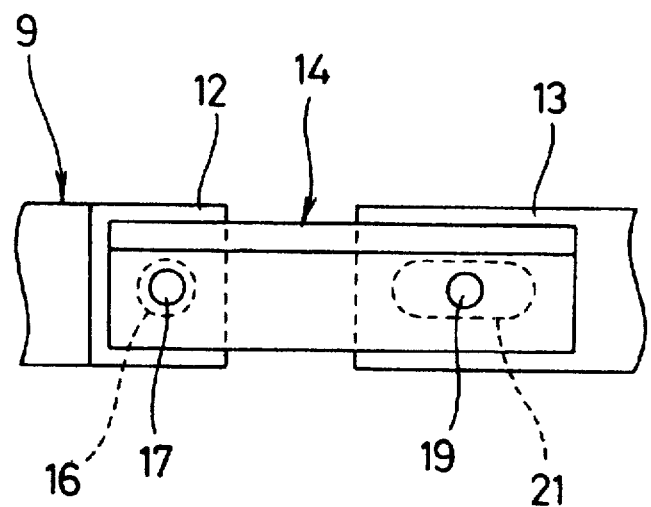
FIG. 13 is a plan view of the principal region of the portion shown in FIG. 12.

In this second embodiment, the other end of the coupling piece 14 is formed at one place thereon with a second coupling hole 19 of the same construction as that of the coupling hole 17 extending therethrough, said coupling hole 19 also being formed with a larger diameter portion 20. The inner peripheral surface of the thin-walled portion 13 is formed with a circumferentially extending groove 21. As shown in FIG. 13, the width of the groove 21 is greater than the inner diameter of the coupling hole 19.

Figure 14:
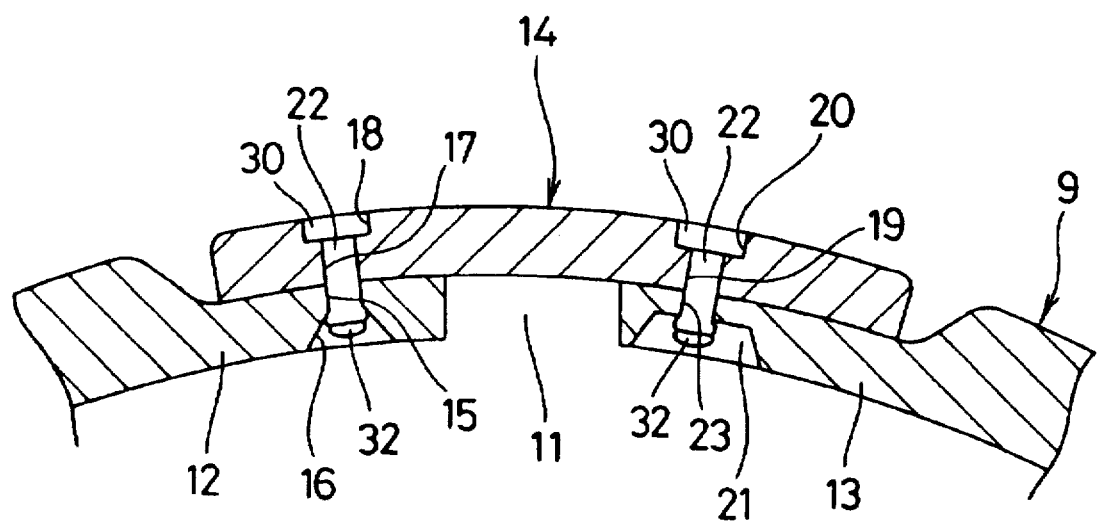
FIG. 14 is a view showing the fastening completion state of the portion shown in FIG. 12.

As shown in FIG. 14, the thin-walled portion 12 and the coupling piece 14 are fastened together, as in the case of the first embodiment described above, by a blind rivet 22 inserted in the coupling hole 17 and connecting hole 15. Further, the thin-walled portion 13 is formed with a through-hole 23, and this thin-walled portion 13 and the connecting piece 14 are fastened together by a similar blind rivet 22 inserted in the coupling hole 19, the through-hole 23 and the groove 21.

Figure 15:
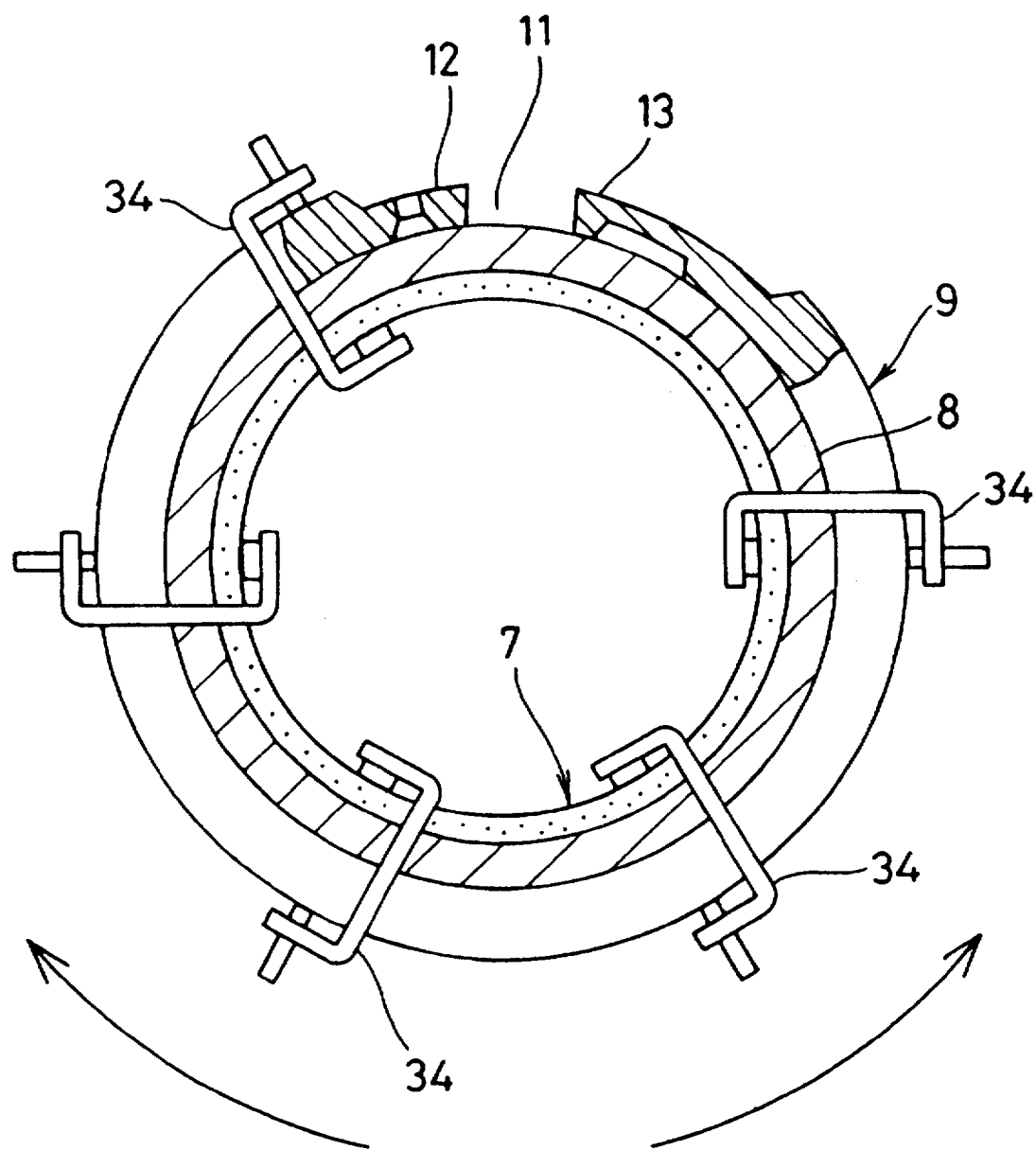
FIG. 15 is a view showing a ring fixed in an annular groove.
Figure 16:
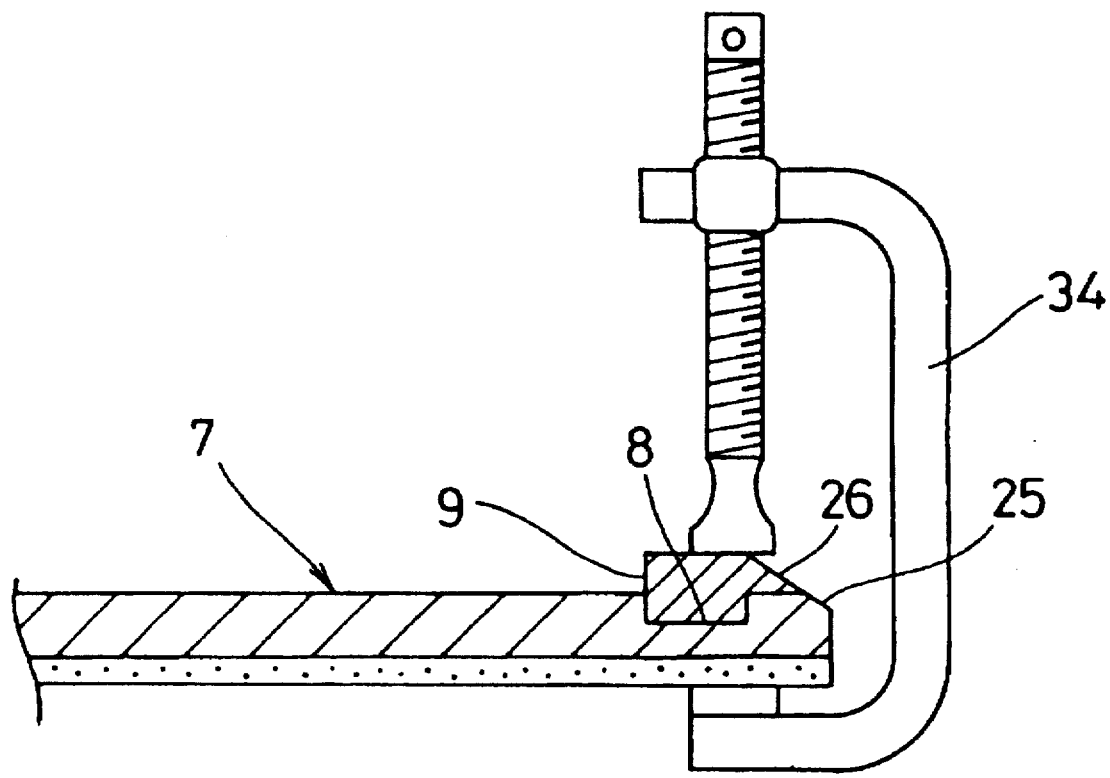
FIG. 16 is a view for explaining the principal region in FIG. 15 in more detail.

In such arrangement, in forming a spigot ridge, the ring 9 is fitted in the annular groove 8 as in the case of the first embodiment. Then, as shown in FIGS. 15 and 16, a plurality of C-clamps 34 are used to clamp the ring 9 in the annular groove 8 at successive places, starting from the side opposite to the circumferentially disposed split 11. At this time, care must be taken not to allow the ring 9 to rise from the outer peripheral surface of the spigot 7 at the front end of the inclined surface 26.

Figure 12:
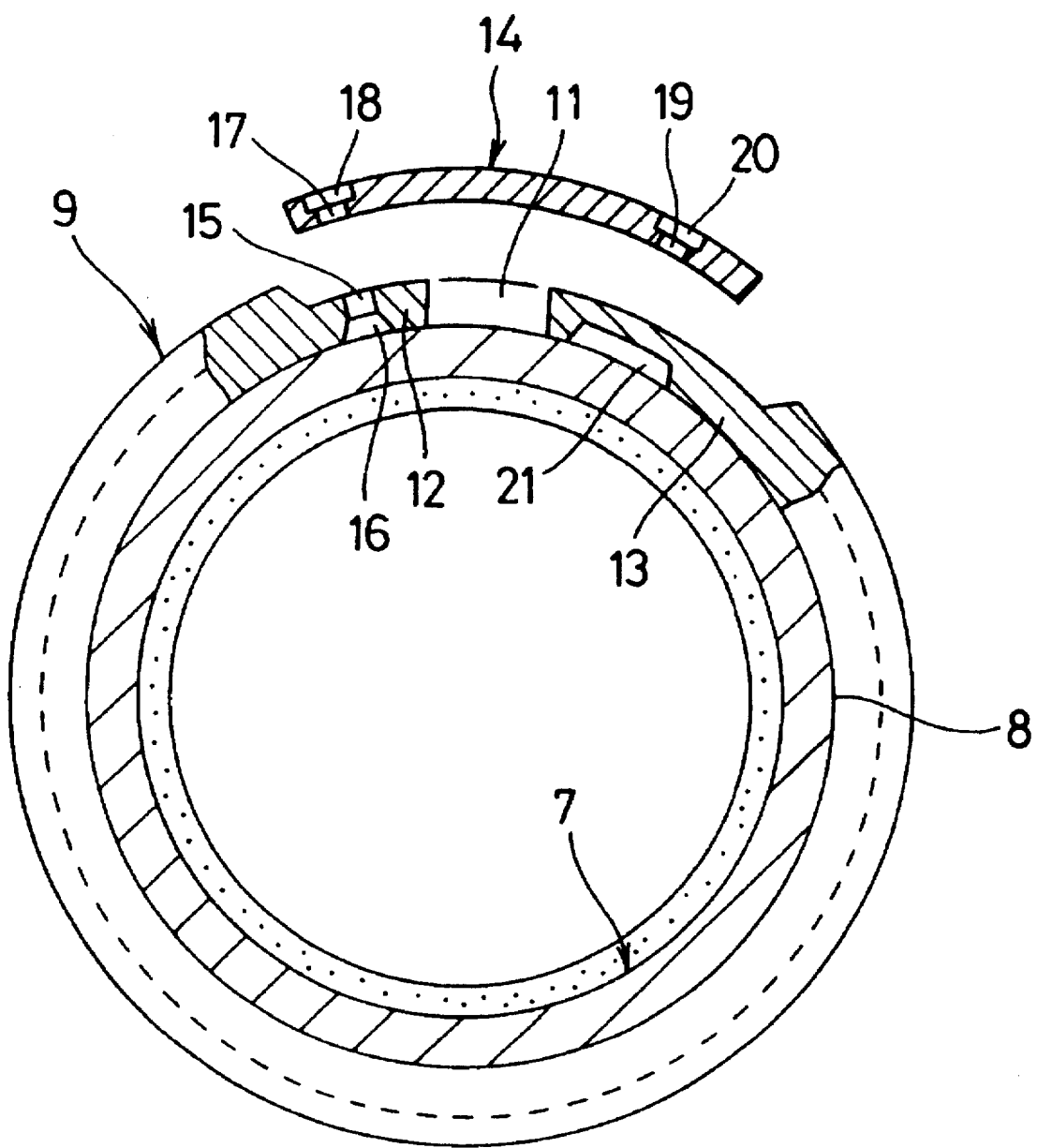
FIG. 12 is a view showing how a ring and a coupling piece are mounted in an annular groove formed in a spigot according to a second, embodiment of the invention.
Figure 17:
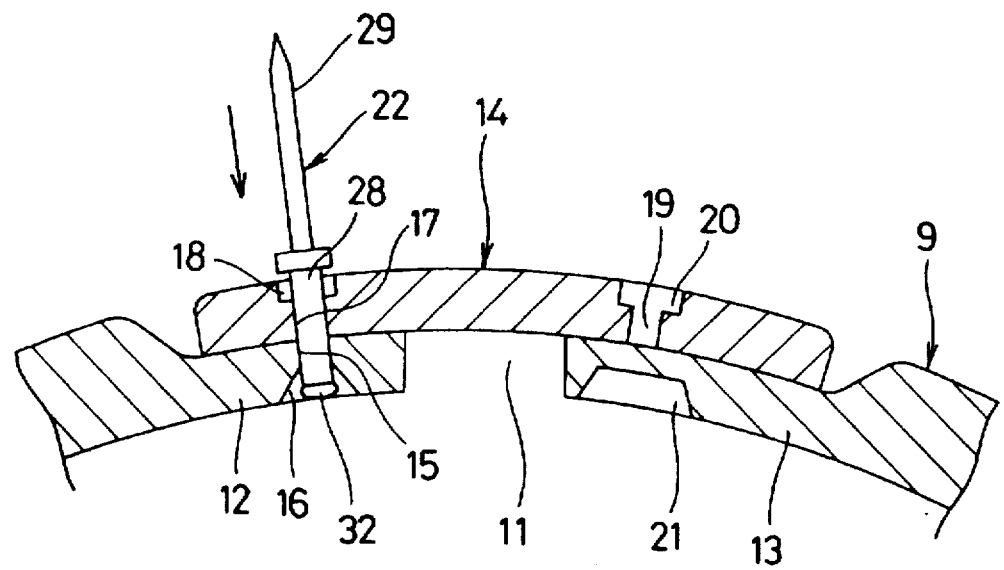
FIG. 17 is a view showing the temporarily fixed state of the coupling piece.

When the ring 9 has thus been fixed in the annular groove 8, the coupling piece 14 is set in the split 11, as shown in FIG. 12, and then as shown in FIG. 17, the blind rivet 22 is inserted in the coupling hole 17 and the connecting hole 15, whereupon a C-clamp is applied to likewise fix said coupling piece 14 in position.

Figure 18:
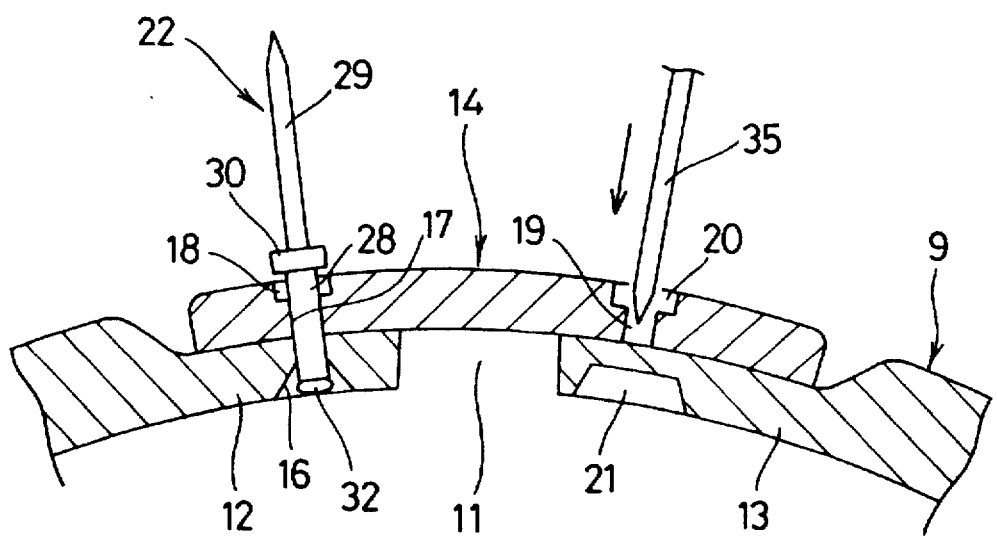
FIG. 18 is a view showing a through-hole forming method.
Figure 19:
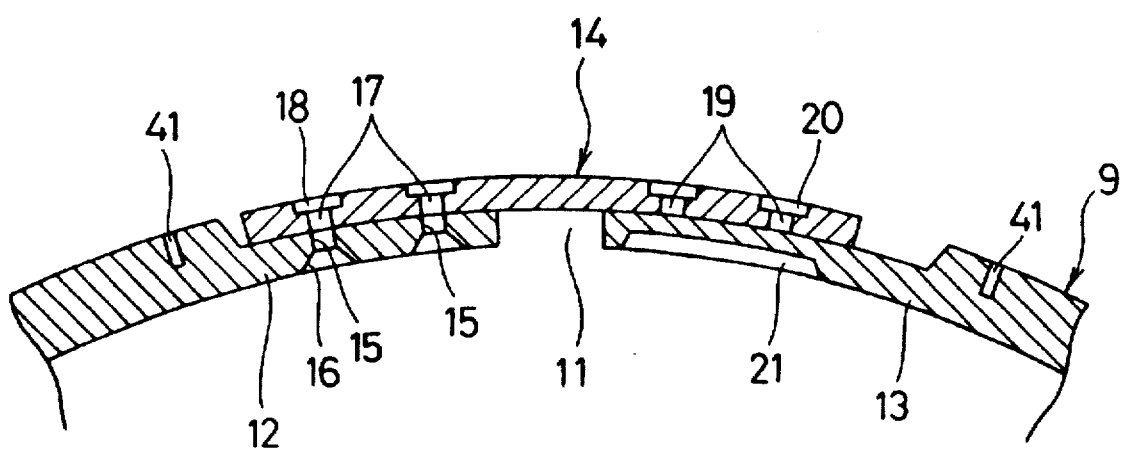
FIG. 19 is a view showing the principal region of a ring and a coupling piece according to a third embodiment of the invention.

And, as shown in FIG. 18, a drill 35 having a somewhat smaller diameter than that of the second coupling hole 19 is inserted in said hole 19 for its tip to form the outer surface of the thin-walled portion 13 of the ring 9 with a scribed mark which is concentric with the hole 19.

Then, all C-clamps 34 are loosened and removed from the annular groove 8, and a through-hole 23 reaching the groove 21 is formed at the position of the scribed mark. This throughhole 23 is processed by a drill of a size which is capable of providing a determined hole diameter somewhat greater than that of the aforesaid scribing drill 35. And the thus processed ring 9 is fitted again in the annular groove 8 and fixed in position by the C-clamps 34. In addition, if there is no danger of damaging the annular groove 8 and cutting tips can be removed, the through-hole 23 may be formed by removing the coupling piece 14 alone while leaving the ring 9 fixed in the annular groove 8.

Further, the coupling piece 14 is set again and a blind rivet 22 is inserted in the coupling hole 17 and the connecting hole 15 in the ring 9 and another blind rivet 22 is also inserted in the second coupling hole 19 and the throughhole 23, and the coupling piece 14 is fixed in position by C-clamps 34.

And the extractive rods 29 are extracted as described above, whereby as shown in FIG. 14 the coupling piece 14 and the thin-walled portion 12, and also the coupling piece 14 and the thin-walled portion 13, are respectively fastened together by the rivets 22. At this time, in the thin-walled portion 12, the other end 31 of the rivet body 28 and the bead 32 are caulked against the diameter-increased portion 16, as in the case of the first embodiment. In the thin-walled portion 13, the other end 31 of the rivet body 28 and the bead 32 are caulked against the groove 21.

In this second embodiment, even if the outer diameter of the spigot 7 varies within the tolerance, it is possible to form the through-hole 23 at a position where it is aligned with the coupling hole 19. Furthermore, since the groove 21 is formed to extend circumferentially, it can be opposed to the through-hole 23 so long as it is located within the range allowed by said tolerance.

Thus, in the second embodiment also, the ring 9 can be fitted in the annular groove 8 by simple processing and riveting, not only in a manufacturing plant but also in the case where pipes are cut in a pipe laying site. Therefore, even if pipes are cut in this site, there is no need to perform welding or the like in this site. Further, there is no need whatsoever for troublesome operations, such as conveying a pipe for fitting a ring 9 thereon and welding it and then conveying it again to the pipe laying site. Furthermore, since the ring 9 is connected at the split by the coupling piece 14, it is possible to prevent the accident of the ring slipping off the annular groove 8 as it increases in diameter after it has been mounted in the annular groove 8.

FIGS. 19 through 23 show a third embodiment of the invention.

Whereas FIGS. 12 through 18 have shown an example suitable for forming a ridge on the outer periphery of the spigot of a pipe of relatively small diameter, FIGS. 19 through 23 show an example suitable for application to a pipe of relatively large diameter.

As shown, the first and second coupling holes 17 and 19 in the coupling piece 14 are provided respectively in a pair, and the connecting holes 15 in the thin-walled portion 12 are provided also in a pair. The groove 21 in the thin-walled portion 13 has a length capable of coping with said tolerance in consideration of said pair of second coupling holes 19. Formed at positions farther from the split 11 than the thin-walled portions 12 and 13 in the ring 9 are bottomed contracting holes 41.

Figure 20:
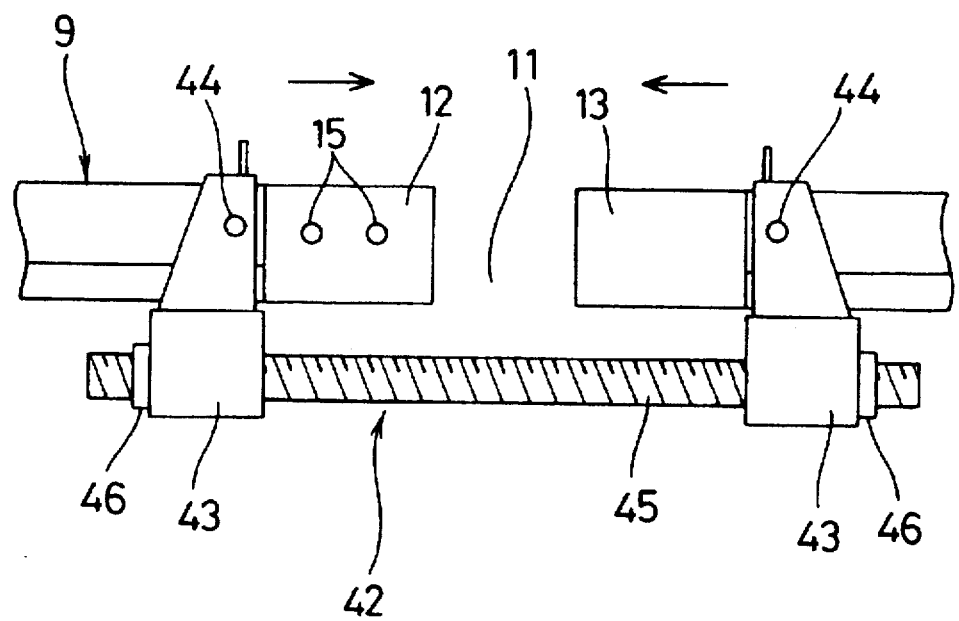
FIG. 20 is a view showing a contracting tool for contracting the ring shown in FIG. 19.
Figure 21:
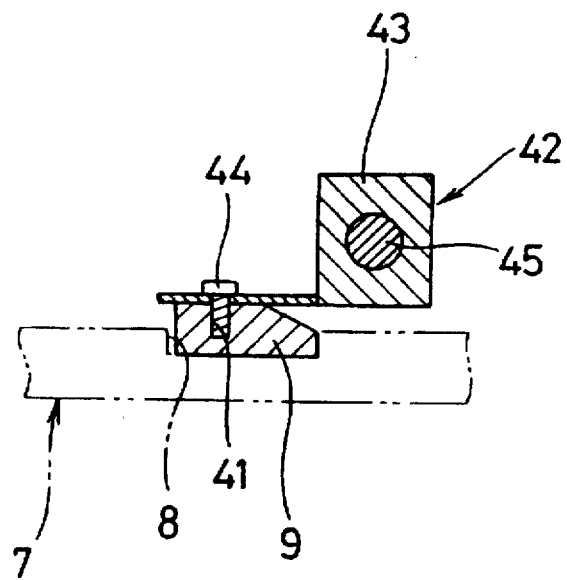
FIG. 21 is a sectional view of the principal region of the contracting tool of FIG. 20.

In fixing the ring 9 in the annular groove 8, instead of said C-clamps, use is made of a contracting tool 42 as shown in FIGS. 20 and 21. This contracting tool 42 has a pair of brackets 43, each being provided with a projection 44 to be fitted in the contracting hole 41. The projections 44 may be in the form of set screws or the like. An adjusting screw 45 is provided between the brackets 43, the opposite ends of said adjusting screw 45 extending through the brackets 43, with nuts 46 threadedly fitted on its portions projecting through the brackets 43. Therefore, by operating the nuts 46 to move the brackets 43 toward each other, the ring 9 can be contracted.

In such arrangement, in forming a spigot ridge, the ring 9 is likewise fitted in the annular groove 8 and, as shown in FIGS. 20 and 21, the projections 44 on the contracting tool 42 are fitted in the contracting holes 41. And the nuts 46 are turned to contract the ring 9 until the latter no longer moves, whereby the ring 9 is fixed in the annular groove 8.

Figure 22:
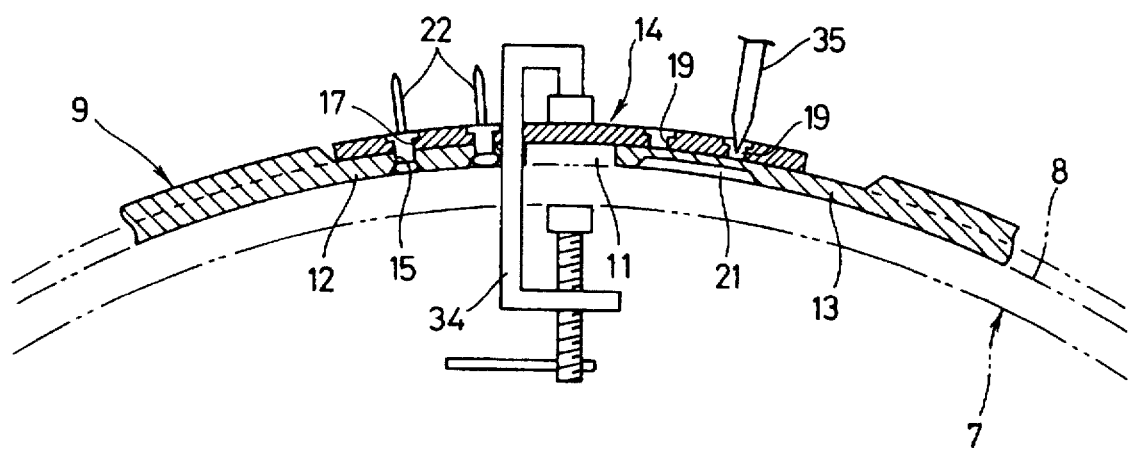
FIG. 22 is a view showing the temporarily fixed state of the coupling piece of FIG. 19.

Then, the coupling piece 14 is set as shown in FIG. 22, and with a blind rivet 22 temporarily inserted in the coupling hole 17 and the connecting hole 15, the coupling piece 14 is fixed by a C-clamp 34. And, in this condition, a scribed mark is drawn by the drill 35 making use of the second coupling hole 19.

Figure 23:
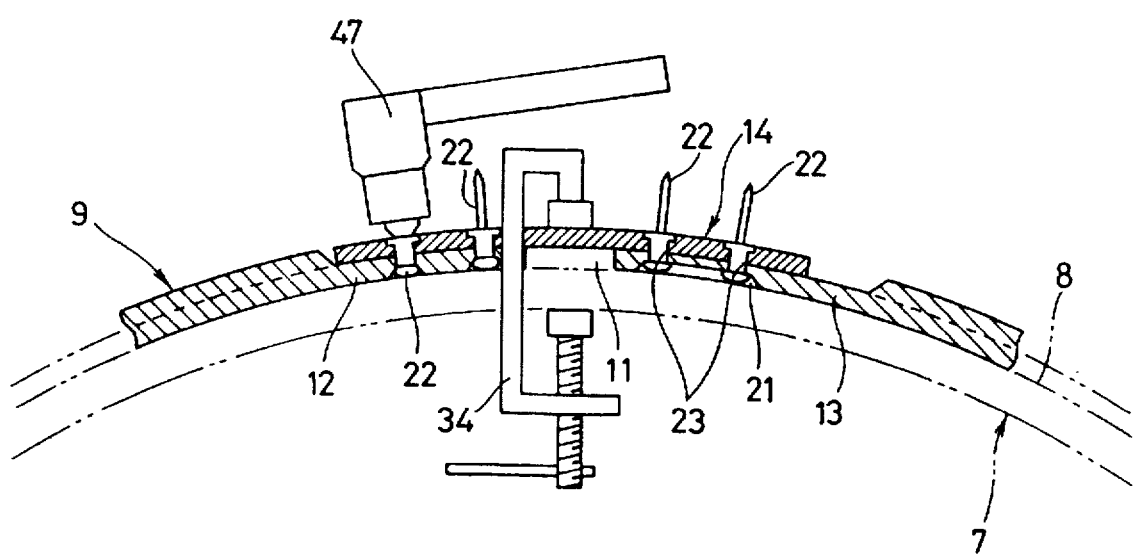
FIG. 23 is a view for explaining the fastening operation using blind rivets.

Thereafter, the ring 9 is removed from the annular groove 8, a through-hole 23 reaching the groove 21 is formed in the thin-walled portion 13, the ring 9 is fitted again in the annular groove 8, and the coupling piece 14 is set, whereupon riveting is performed as shown in FIG. 23. A hand riveter 47 for fixing blind rivets 22 is shown in FIG. 23.

The number of coupling holes 17 and coupling holes 15 may be optionally determined according to the bore of the pipe or other factors. Similarly, as to the coupling holes 19 and through-holes 23 associated with the thin-walled portion 13, the number may be optionally determined.

FIGS. 24 through 27 show a fourth embodiment of the invention.

Figure 24:
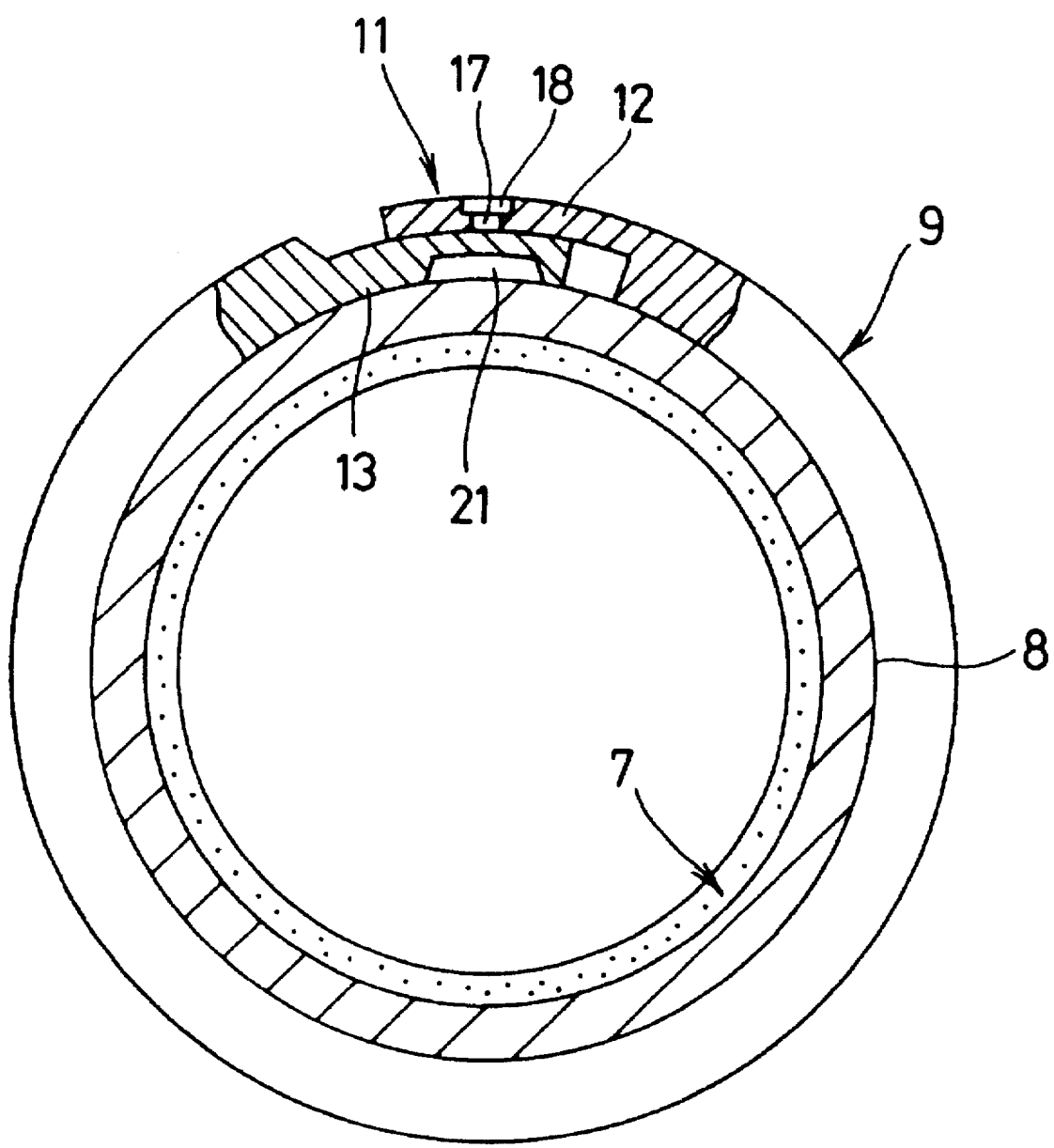
FIG. 24 is a view showing the principal region of a ring and a coupling piece according to a fourth embodiment of the invention.

As shown in FIG. 24, the ring 9 is split at one circumferential place, and the circumferentially opposite ends of the ring 9 defining such split 11 are formed with thin-walled portions 12 and 13. These thin-walled portions 12 and 13 are superposed in the radial direction, the formation of the thin-walled portions being such that the sum of the thicknesses of the outer and inner thin-walled portions 12 and 13 is equal to the radial thickness of the ring 9 except at the split 11. Further, the thin-walled portions 12 and 13 are superposed for a given circumferential length and extend beyond the superposed portion. Thereby, the ring 9 can be increased or decreased in diameter to a certain extent while maintaining the thin-walled portions 12 and 13 in the superposed state.

The outer thin-walled portion 12 is formed at one place with a coupling hole 17 radially extending therethrough. This coupling hole 17 is formed on its outer peripheral surface with a large diameter portion 18. The inner peripheral surface of the inner thin-walled portion 13 is formed with a circumferentially extending groove 21.

Figure 27:
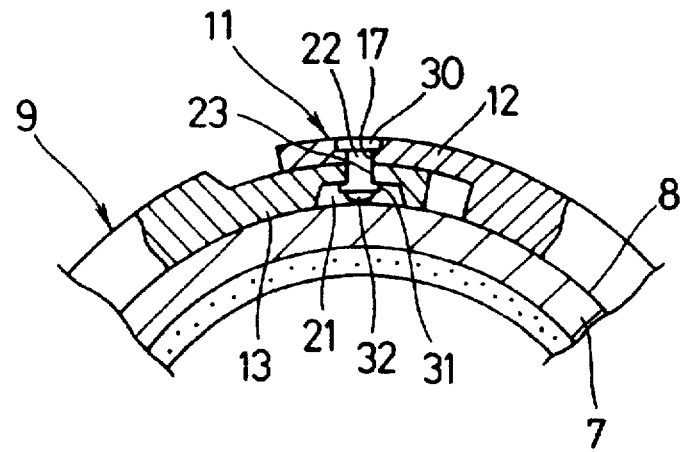
FIG. 27 is a view showing the fastening completion state of the portion shown in FIG. 24.

As shown in FIG. 27, one thin-walled portion 12 and the other thin-walled portion 13 are fastened together by a blind rivet 22 inserted in the coupling hole 17 and in the through-hole 23 and groove 21 which are formed in the other thin-walled portion 13.

Figure 25:
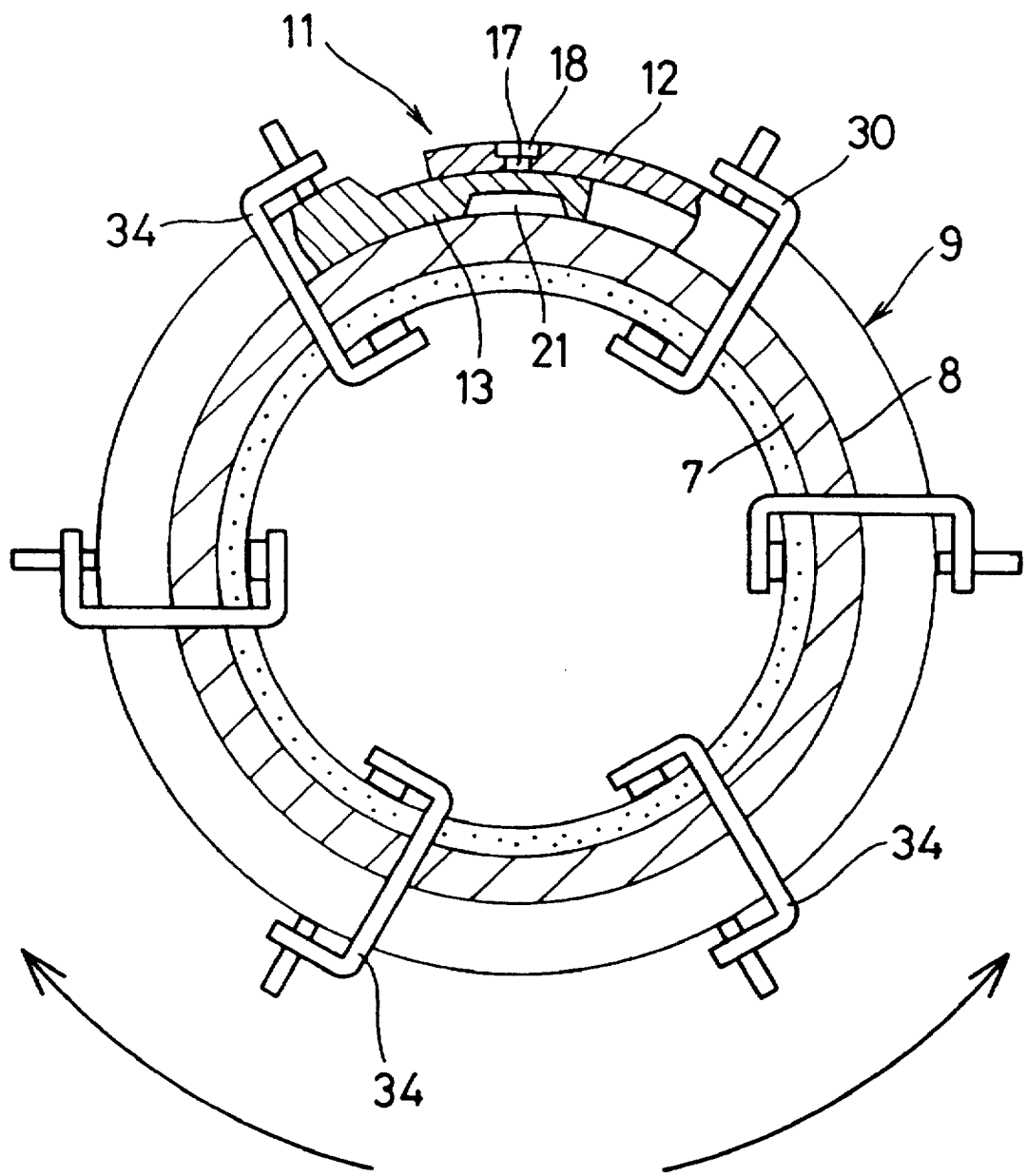
FIG. 25 is a view showing a ring fixed in an annular ring.
Figure 26:
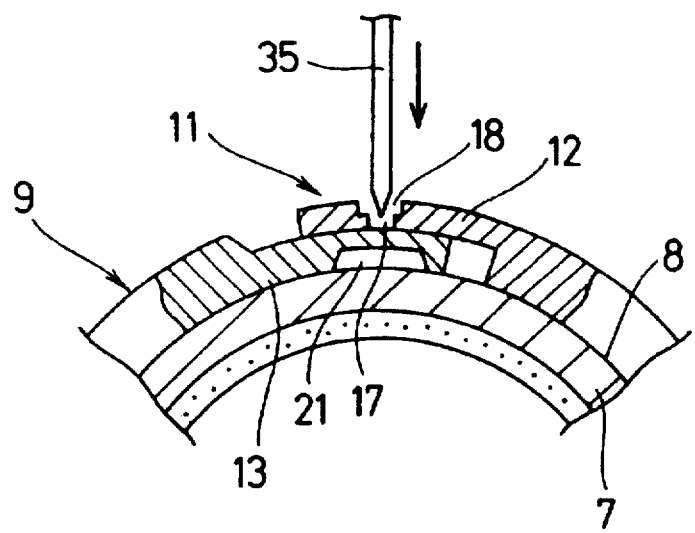
FIG. 26 is a view showing a through-hole forming method.

The method of forming spigot ridges will now be described. When the ring 9 has been fitted in the annular groove 8, as shown in FIG. 25, a plurality of C-clamps 34 are used to clamp the ring 9 in the annular groove 8 at successive places, starting from the side opposite to the circumferentially disposed split 11. And the ring 9 is fixed in the annular groove 8 and with the thin-walled portions 12 and 13 superposed as shown in FIG. 24, a scribed mark concentric with the hole 17 is formed by the tip of a drill 35 as shown in FIG. 26 in the same manner as in FIGS. 18 and 22.

Then, the ring 9 is likewise removed once from the annular groove 8 and a through-hole 23 reaching the groove 21 is formed at the position having the scribed mark. And the thus-processed ring 9 is fitted again in the annular groove 8 and fixed in position by a C-clamp. Thereafter, a blind rivet 22 is inserted in the coupling hole 17, the through-hole 23 and the groove 21. Thus, as shown in FIG. 27, the thin-walled portions 12 and 13 are fastened together by this blind rivet 22.

In this fourth embodiment also, in the case where the outer diameter of the spigot 7 varies within the tolerance, it is possible to form the through-hole 23 at a position where it is aligned with the coupling hole 17. Furthermore, since the groove 21 is formed to extend circumferentially, it can be opposed to the through-hole 23 so long as it is located within the range allowed by said tolerance. In addition, in this fourth embodiment also, the number of coupling holes 17 and through-holes 23 may be optionally determined according to the bore of the pipe or other factors.

Further, as in the case of the first embodiment, it is also possible to form an elongated hole in one thin-walled portion and a plurality of connecting holes in the other thin-walled portion.

What is claimed is:

1. A pipe having a ridge on the outer surface of a spigot formed at the pipe end, comprising:

an annular groove formed in the outer periphery of said spigot, a ring fitted in said annular groove and having one or more circumferentially disposed splits, a pair of thin-walled portions formed at circumferentially opposite ends of the ring forming said split, and means for connecting said thin-walled portions together by operation performed from the outer peripheral side of the ring, said connecting means connecting said thin-walled portions together, with the ring diameter being adjusted according to the tolerance of the outer diameter of the pipe.

2. A pipe as set forth in claim 1, including a coupling piece disposed between the pair of thin-walled portions.

3. A pipe as set forth in claim 2, including:

a first fastening element for fastening the thin-walled portion disposed on one side and the coupling piece, a plurality of circumferentially disposed connecting holes radially extending through one of the thin-walled portion disposed on the other side and the, coupling piece, a circumferentially elongated hole radially extending through the other of the thin-walled portion disposed on the other side and the coupling piece and adapted to overlap at least one of said plurality of connecting holes according to the tolerance of the outer diameter of the pipe, and a second fastening element inserted in said connecting hole and elongated hole to fasten the thin-walled portion disposed on the other side and the coupling piece to each other.

4. A pipe as set forth in claim 3, wherein the thin-walled portion disposed on one side has a coupling hole radially extending therethrough; the coupling piece has a connecting hole radially extending therethrough and adapted to overlap said coupling hole; and the first fastening element is inserted in said coupling hole and said connecting hole.

5. A pipe as set forth in claim 3, wherein the first and second fastening elements are blind rivets or screws.

6. A pipe as set forth in claim 2, including:

a first fastening element for fastening the thin-walled portion disposed on one side and the coupling piece, a coupling hole formed in one of the thin-walled portion disposed on the other side and the coupling piece, to radially extend therethrough, a groove formed in the inner peripheral surface of the other of the thin-walled portion disposed on the other side and the coupling piece and having a given circumferential length, a through-hole formed in the other of the thin-walled portion disposed on the other side and the coupling piece to lead to said groove to establish communication between said coupling hole and said groove, and a second fastening element inserted in said coupling hole and said through-hole and adapted to engage said groove to fasten said thin-walled portion disposed on the other side and said coupling piece to each other.

7. A pipe as set forth in claim 6, wherein the thin-walled portion disposed on one side has a coupling hole radially extending therethrough; the coupling piece has a connecting hole radially extending therethrough and adapted to overlap said coupling hole; and the first fastening element is inserted in said coupling hole and said connecting hole.

8. A pipe as set forth in claim 6, wherein the first and second fastening elements are blind rivets or screws.

9. A pipe as set forth in claim 1, wherein the thin-walled portion disposed on one side and the thin-walled portion disposed on the other side are superposed on each other and fastened together by a fastening element or fastening elements.

10. A pipe as set forth in claim 9, including:

a coupling hole formed in the outer thin-walled portion to radially extend therethrough, a groove formed in the inner peripheral surface of the inner thin-walled portion and having a given circumferential length, a through-hole formed in the inner thin-walled portion to lead to said groove to establish communication between said coupling hole and said groove, the fastening element being inserted in said coupling hole and said through-hole and adapted to engage said groove to fasten the thin-walled portion disposed on one side and the thin-walled portion disposed on the other side to each other.

11. A pipe as set forth in claim 10, wherein the fastening element is a blind rivet or screw.

12. A method of forming a ridge on the outer periphery of the spigot on the end of a pipe, comprising the steps of:

fitting a ring having a circumferentially disposed split or splits in an annular groove formed in the outer periphery of said spigot, said diameter of the ring corresponding to the tolerance of the outer diameter of the pipe, and interconnecting a pair of thin-walled portions formed on the circumferentially opposite ends of the ring defining said split by connecting means which is operated from the outer peripheral side of the ring.

13. A method of forming a ridge as set forth in claim 12, including the steps of:

installing a coupling piece between the thin-walled portion disposed on one side and the thin-walled portion disposed on the other side, fastening the thin-walled portion disposed on one side and the coupling piece to each other by a first fastening element, fastening the thin-walled portion disposed on the other side and the coupling piece to each other by a second fastening elements inserted in a plurality of circumferentially disposed connecting holes formed in one of the thin-walled portion disposed on the other side and the coupling piece to extend radially therethrough, and a circumferentially elongated hole formed in the other of the thin-walled portion disposed on the other side and the coupling piece to radially extend therethrough and adapted to overlap at least one of said plurality of connecting holes according to the tolerance of the outer diameter of the pipe.

14. A method of forming a ridge as set forth in claim 12, including the steps of:

installing a coupling piece between the thin-walled portion disposed on one side and the thin-walled portion disposed on the other side, temporarily attaching the thin-walled portion disposed on one side and the coupling piece to each other by a first fastening element, thereby positioning the thin-walled portion disposed on one side and the coupling piece with respect to each other, forming a coupling hole in one of the thin-walled portion disposed on the other side and the coupling piece to extend radially therethrough, while forming a groove in the inner peripheral surface of the other of the thin-walled portion disposed on the other side and the coupling piece, said groove having a given circumferential length, superposing said thin-walled portion disposed on the other side and said coupling piece on each other in the state in which said thin-walled portion disposed on one side and the coupling piece are temporarily attached to each other, thereby determining the position for a through-hole for establishing communication between the coupling hole and the groove, forming such through-hole in said position and fastening the thin-walled portion disposed on the other side and the coupling piece by a second fastening element inserted in said coupling hole and said through-hole to engage said groove, fastening said thin-walled portion disposed on one side and said coupling piece by the first fastening element.

15. A method of forming a ridge as set forth in claim 12, including the steps of:

superposing the thin-walled portion disposed on one side and the thin-walled portion disposed on the other side on each other, determining the position for a through-hole on the inner thin-walled portion, said through-hole serving to establish communication between a coupling hole formed in the outer thin-walled portion to radially extend therethrough and a groove formed in the inner peripheral surface of the inner thin-walled portion to have a given circumferential length, forming such through-hole in said position and fastening the outer and inner thin-walled portions to each other by a fastening element inserted in said coupling hole and said through-hole to engage said groove.

* * * * *